United States Patent [19]
Travor et al.

[11] Patent Number: 6,134,183
[45] Date of Patent: Oct. 17, 2000

[54] UNDER-ICE SURVEILLANCE BUOY

[75] Inventors: Bruce W. Travor, Holland; Roger A. Holler; Donald H. Scott, III, both of Warminster; Martha E. Snyderwine, Holland, all of Pa.

[73] Assignee: The United States of America as represented by the Secretary of the Navy, Washington, D.C.

[21] Appl. No.: 07/566,693

[22] Filed: Aug. 1, 1990

[51] Int. Cl.$^7$ ...................................................... H04B 1/59
[52] U.S. Cl. ................................................................ 367/4
[58] Field of Search .......................... 367/3, 4; 441/33–34

[56] References Cited

U.S. PATENT DOCUMENTS 4,279,025  7/1981  Suppa ............................................ 367/3

*Primary Examiner*—Daniel T. Pihulic
*Attorney, Agent, or Firm*—Ron Billi

[57] ABSTRACT

An air-launched sonobuoy, particularly useful for under-ice surveillance, carries a descent-retardation parachute whose lanyards activate a surface float during descent. Upon impact into an ice region, a slip-rod is jarred loose from the cannister top thus freeing the surface float, and its RF antenna, to remain above the ice while the remainder of the components deploy.

5 Claims, 4 Drawing Sheets

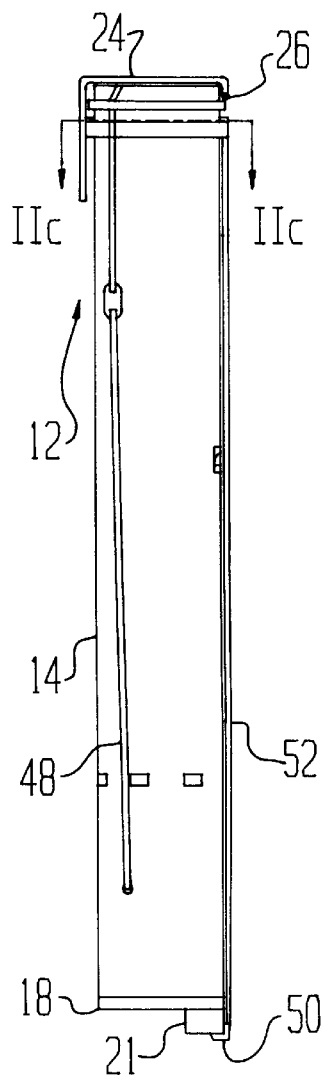
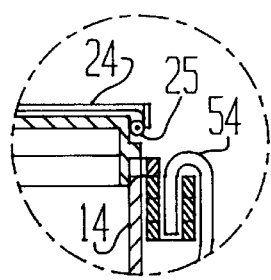
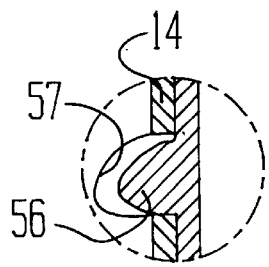
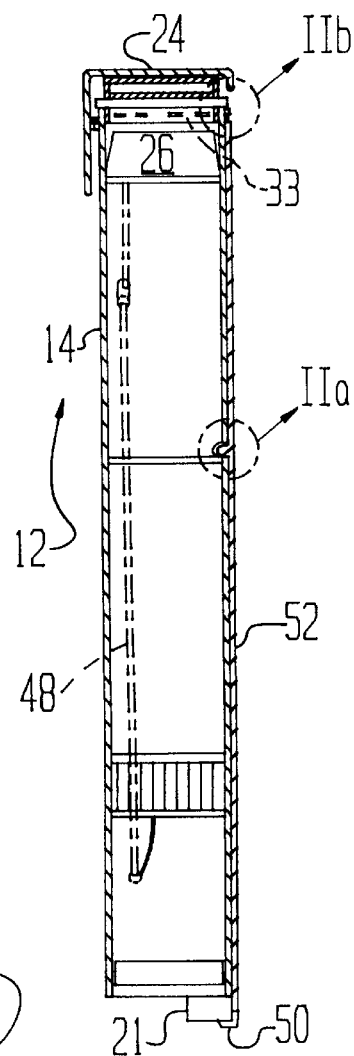
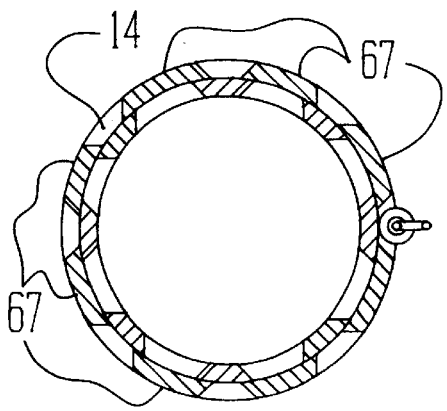
FIG. 1
FIG. 2b
FIG. 2a
FIG. 2
FIG. 2c

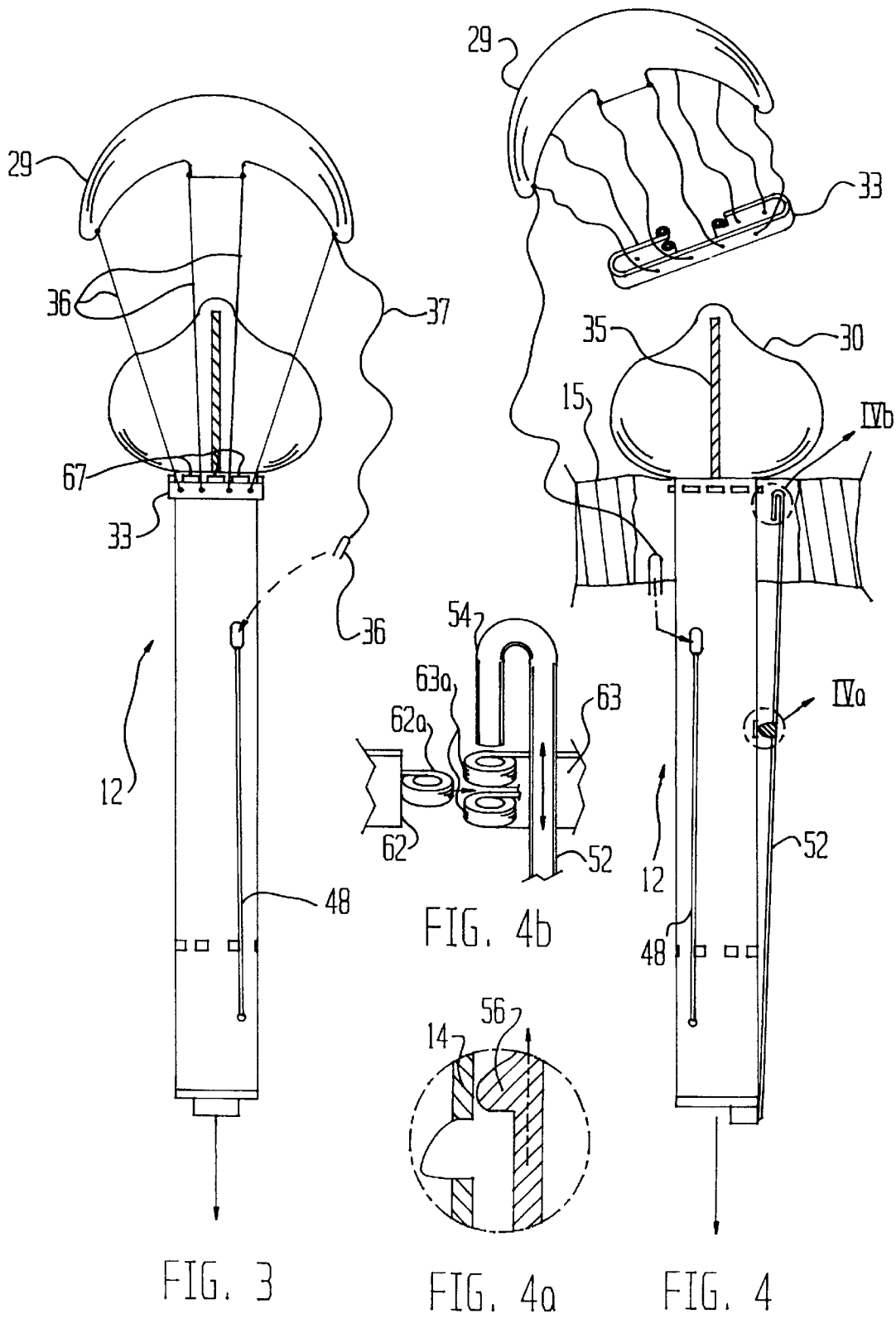

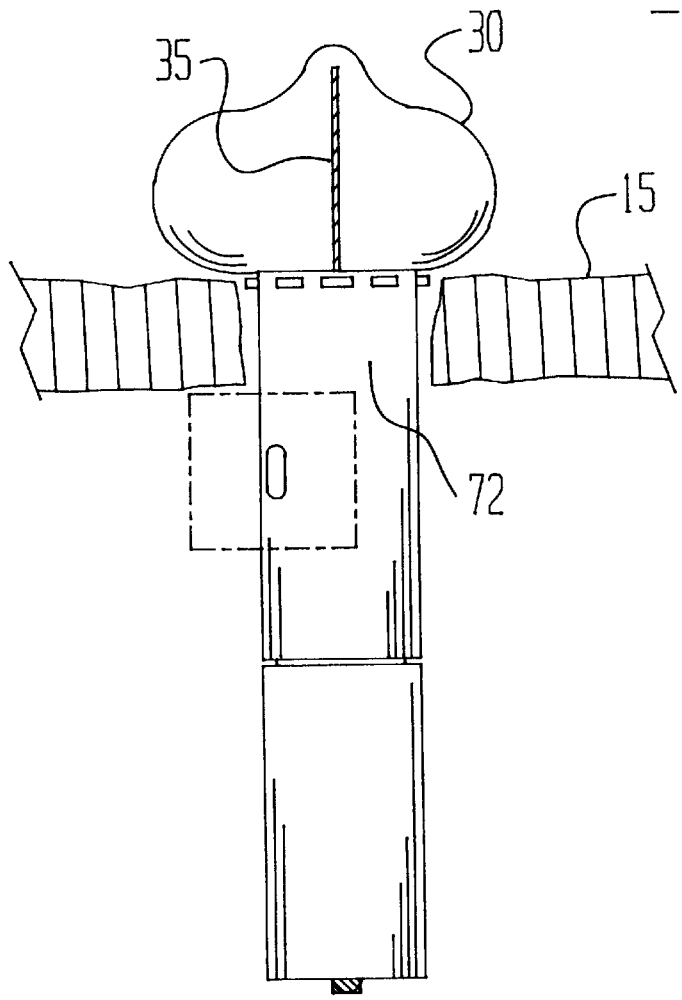
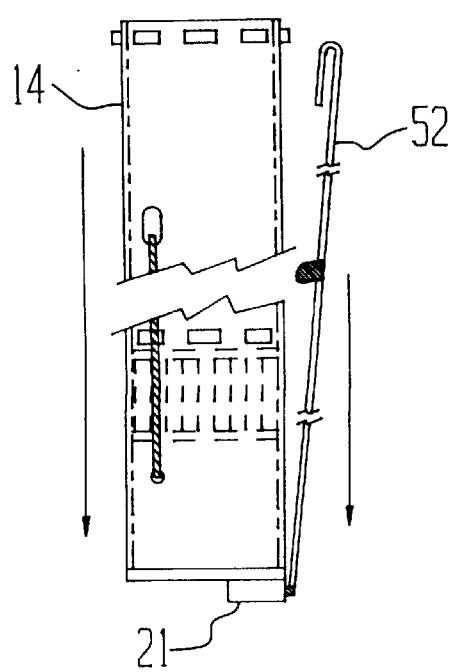
FIG. 5

UNDER-ICE SURVEILLANCE BUOY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

It can become very difficult to implant a properly working surveillance device in Northern waters that may be covered, or partially covered, with ice fields. Also, most air-launched devices do not contact the surface in a straight vertical manner, but rather at a slant angle of approximately twenty degrees, or even more, and then descend several feet below the surface before inflation of the surface float. When the float inflates, the device will generally rise to below the ice cover and lay over on its side. Since the RF antenna is usually contained in the surface float, this sideways orientation of the antenna results in poor, or no, communications.

SUMMARY OF THE INVENTION

A cylindrical, under-ice surveillance sonobuoy is air-dropped to guided descent via a parachute canopy attached to one end of thereof. The opening of the parachute activates a battery-powered circuit that causes an RF-antenna containing surface float to be inflated with compressed gas. When the weighted, bottom end of the buoy contacts an ice surface, an impact-sensing device releases the parachute harness and allows the sonobuoy components to deploy according to preset conditions.

It is therefore an object of the present invention to provide an under-ice sonobuoy that will maintain its RF-antenna in a upright, above-ice position when deployed in an ice field.

It is another object of the present invention to provide an under-ice sonobuoy that has an RF-antenna containing surface float that will inflate prior to termination of descent.

It is a still further object of the present invention to provide an under-ice surveillance sonobuoy that uses a descent retardation parachute to maintain guided descent to an ice field.

It is a still further object of the present invention to provide an under ice surveillance sonobuoy that uses a spring-loaded mechanical device to free the descent guiding parachute and allow deployment of the sonobuoy components.

These and other objects, advantages and novel features of this invention will become apparent from the following detailed description when considered in conjunction with the accompanying drawings.

BRIEF DESCRIPTION OF THE DRAWINGS

FIG. 1 shows a front elevational view of an under-ice sonobuoy;

FIG. 2 shows a front elevational view with portions cutaway;

FIG. 2a is an enlarged, isolated detail view of the mid-point section at IIa of FIG. 2;

FIG. 2b is an enlarged, isolated detail view of the hook section at IIb of FIG. 2;

FIG. 2c is a cross-section view of shell 14 taken along lines IIc of FIG. 1;

FIG. 3 shows a side elevational view of the sonobuoy after the descent retardation parachute and surface float have deployed;

FIG. 4 shows a view similar to FIG. 3 after the buoy has landed in an ice field;

FIG. 4a is an enlarged, isolated detail view of the mid-point section at IVa of FIG. 4;

FIG. 4b is an enlarged, isolated detail view of the hook section at IVb of FIG. 4;

FIG. 5 is a diagrammatic view of the sonobuoy deploying the under-ice components.

DETAILED DESCRIPTION OF THE PREFERRED EMBODIMENTS

Figure 6:
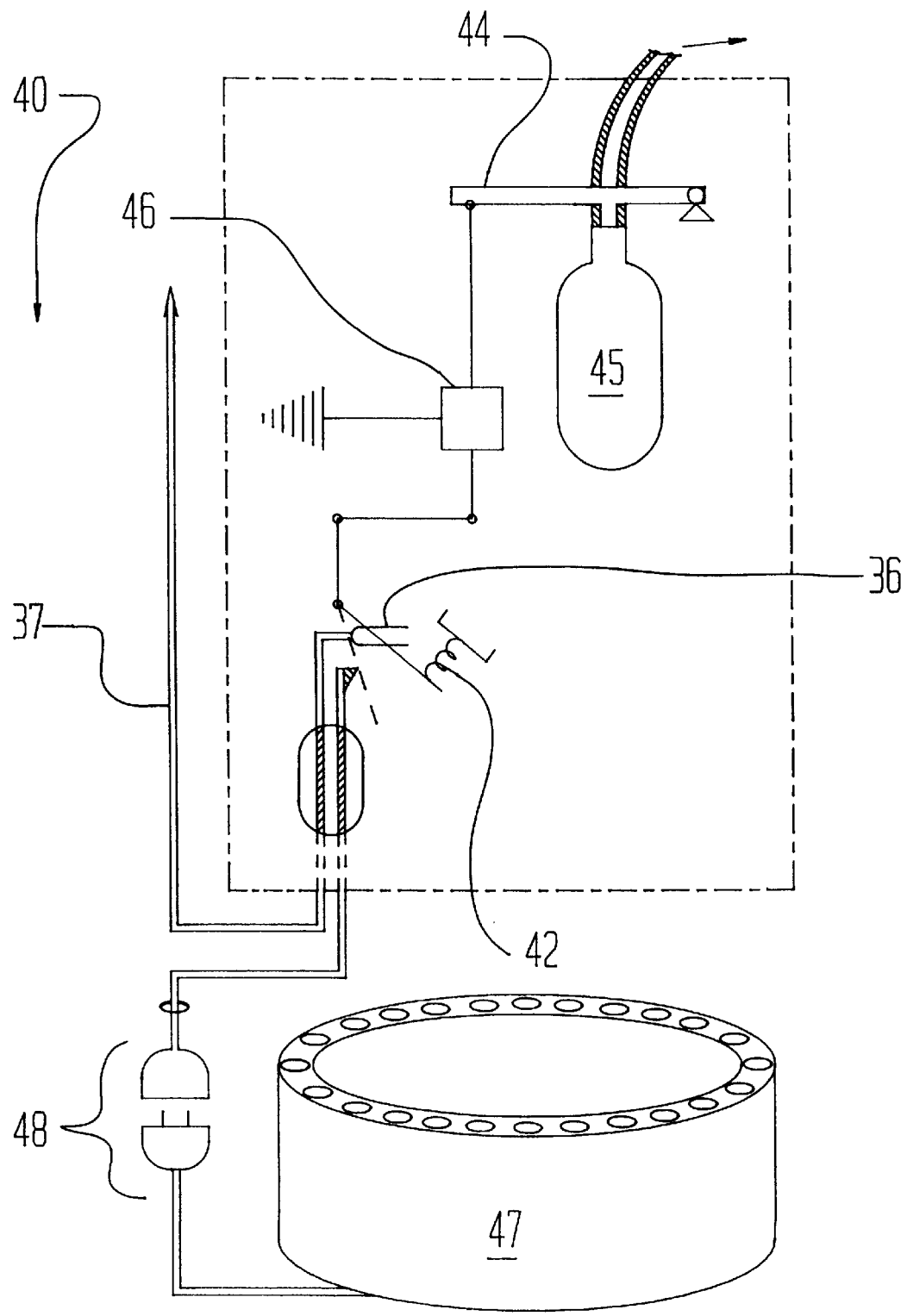
FIG. 6 is a schematic diagram of the float inflation circuitry.

The under-ice surveillance sonobuoy of the present invention comprises an air-launched, cylindrical sonobuoy, containing components, such as a hydrophone, an electronics sensor package, a cable pack and an RF antenna-containing surface floats packed inside cannisters. FIG. 1 shows a front elevational view of the under-ice surveillance sonobuoy 12, while FIG. 2 shows a front elevational view with portions of the outer tubular shell 14 cutaway to show details of the inner sonobuoy components. Shell 14 is a slender, tubular shell with various sonobuoy components arranged inside an inner cannister, such as 72 (as seen in FIG. 5) and having at one end (the lower end when looking at FIGS. 1 and 2) a sealing cap 18 and an impact weight 21 attached thereto, and at the opposite end (the upper end when looking at FIGS. 1 and 2) a standard wind-flap, schematically represented at 24, connected as at 25, covering the descent retardation means 26. As seen in FIG. 3, the descent retardation means is a larger-than-standard parachute canopy 29 attached via longer-than-standard lanyards 31 to a spring steel harness belt 33, as will be described, and activated as is known, by a parachute release spring.

FIG. 3 shows a side elevational view of buoy 12 after canopy 29 has been inflated, after wind-flap 24 (not shown) has activated and allowed the parachute release mechanism to push canopy 29 into the windstream. Risers 38 are made longer than usual to allow a buoy float 30 to inflate while buoy 12 is descending. As shown, a clip 36 has been pulled by canopy line 37 from the electronic inflation circuitry 40, shown schematically in FIG. 6. Circuitry 40 reacts, once clip 36 is pulled away from a spring-activated, normally-open switch 42, to apply power from a battery 47 to a squib 46 that drives a pin into a source of compressed gas 45 to allow inflation of buoy float 30, which carries an RF antenna 35. Circuitry 40 receives its power from battery 47 via electrical connection 48, as is known, and antenna 35 is connected (not shown) to the rest of the sonobuoy components.

The impact sensing capability of buoy 12 comes from the compression of the bottom of buoy 12 and weight 21, which, because of its heavier weight than the remaining buoy parts, is the first surface to make contact when buoy 12 hits an ice field 15 (as shown in FIG. 4). A very inflexible J-rod 52 is securely attached to weight 21, as at 50, adjacent the lowermost surface of weight 21 and sits adjacent the outside surface of shell 14. J-rod 52 is so named because of the hook 54 at the uppermost end that constrains harness belt 33, as will be explained. Rod 52 has a protusion 56, (as seen in FIG. 2a) at its mid-point, that is normally seated inside cavity 57 in the side of shell 14, and normally remains adjacent the side of shell 14. The J-hook end of rod 52 fits inside of clasping means, or the inter-layered ends 62,63, of belt 33, locking into loops 62a amd 63a, as seen in FIGS. 2a and 2b. Belt 33, when closed around the upper end of shell 14 and secured by the J-hook 54, is fastened beneath a plurality of projections 67, as seen in FIG. 2C. Projections 67 can be small, rectangularly-shaped areas pressed outwardly along parallel edges, or other similar means, and serve to hold belt 33 against shell 14 as long as J-hook 54 remains in place.

Sonobuoy 12 is designed to allow float 30 to be inflated while the buoy is descending through the air. Impact weight 21 and end 50 of J-rod 52 contact the ice surface first and the impact jolt, or force, on end 50 initially compresses the bottom of buoy 12 and starts an initial longitudinally and vertically directed movement of rod 52. As shown by the diagrammatic arrow in FIG. 4a, the initial upward movement causes protusion 56 to bump up against the top surface of cavity 57, and, because the top surface has been sloped accordingly, then slide outwardly away from cavity 57. This combination movement is repeated by J-hook 54, (as can be seen in FIG. 4b) since J-rod 52 is structurally inflexible, and the hook 54 is thereby, first, forced out of the binding position with loops 62a,63a and then away from that position. As shown in FIG. 4, as soon as J-hook 54 is removed, the spring force in harness belt 33 causes belt 33 to spread open, thereby freeing means 26 from shell 14.

As seen in FIG. 5, once belt 33 springs free from shell 14, the continuing downward momentum of shell 14 carries it away from the inner cannister 72 (optional) containing sonobuoy components, as is known.

Obviously, other embodiments and modifications of the present invention will readily come to those of ordinary skill in the art having the benefit of the teachings presented in the foregoing description and drawings. It is therefore to be understood that various changes in the details, materials, steps and arrangement of parts, which have been described and illustrated to explain the nature of the invention, may be made by those skilled in the art within the principle and scope of the invention as expressed in the appended claims.

What we claim is:

1. An air-launched sonobuoy for under-ice surveillance, comprising:
   a. tubular shell having an upper end and a lower end;
   b. cannister means containing sonobuoy components slidably inserted in said shell;
   c. descent retardation means removably fixed to said upper end of said shell;
   d. impact sensing means connected to an opposite end of said shell to free said descent retardation means and deploy said components into the water; and
   e. means for erecting an inflatable float containing an antenna prior to said sonobuoy making contact with the water.

2. An air-launched sonobuoy as described in claim 1 wherein said descent retardation means comprises a parachute connected by lanyards to a harness spring releasably held at the upper end.

3. An air-launched sonobuoy as described in claim 1 wherein said means for erecting comprises a source of compressed gas, a power source and electrical circuitry connecting said sources and being energized by inflation of said descent retardation means to allow gas to inflate said float.

4. An air-launched sonobuoy as described in claim 1 wherein said impact sensing means comprises a weighted member affixed on the lower surface of said shell and a slip rod removeably extending from the lowermost surface of said weighted member longitudinally adjacent said shell into clasping means in said descent retardation means.

5. An air-launched sonobuoy for under-ice surveillance comprising:
   a. a cylindrically-shaped shell carrying sonobuoy components and having upper and lower ends, and also having, at said lower end, an impact weight;
   b. a longitudinally-extending release rod extending from said weight adjacent the side of said shell to said top end;
   c. a spring-steel retainer band wrapped circumferentially around said upper end, removeably affixed adjacent a plurality of projections by a hook end of said release rod engaging band loops;
   d. a parachute and harness attached to said retainer band;
   e. an inflatable surface float attached to said top end and connected to means to supply compressed gas; and
   f. a parachute-activated electronic circuit connected to said compressed gas supply means.

* * * * *